United States Patent [19]
Gold

[11] Patent Number: 5,961,174
[45] Date of Patent: *Oct. 5, 1999

[54] WATER DRAINAGE AUTO WINDOW MOLDING

[76] Inventor: Peter Gold, 465 N. Wood Rd., Rockville Centre, N.Y. 11570

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,949

[22] Filed: Mar. 17, 1997

[51] Int. Cl.$^6$ ........................................... B60J 10/02
[52] U.S. Cl. ........................ 296/93; 296/146.15; 296/201
[58] Field of Search ................ 296/208, 93, 146.15, 296/201, 154; 52/208, 204.597; 49/476.1

[56] References Cited

U.S. PATENT DOCUMENTS

| | | | |
|---|---|---|---|
| 4,974,901 | 12/1990 | Katayama | 296/201 |
| 5,248,179 | 9/1993 | Biermacher et al. | 296/293 X |
| 5,519,979 | 5/1996 | Kunert et al. | 52/745.15 |
| 5,718,470 | 2/1998 | Yada et al. | 296/208 X |
| 5,752,352 | 5/1998 | Goto et al. | 296/208 X |
| 5,860,688 | 1/1999 | Biondo et al. | 296/93 |

*Primary Examiner*—D. Glenn Dayoan
*Assistant Examiner*—Chad D. Wells
*Attorney, Agent, or Firm*—Myron Amer PC

[57] ABSTRACT

An auto window molding attached to extend from a peripheral edge of the window into a gap in which it has a U-shaped configuration serving as a flow passage to drain off rain and melting snow. The free end or leg of the U-shape is provided with a first encountered concave shape and a next encountered convex shape which keeps the flow passage open when the molding is bent around the small radius corners of the window, due to abutment at the change in curvature of the leg with the U-shape that is on the window peripheral edge, which abutment limits the inward movement of the leg as could result in the closing of the flow passage.

1 Claim, 1 Drawing Sheet

WATER DRAINAGE AUTO WINDOW MOLDING

The present invention relates to improvements in an auto window/windshield molding of a type which functions as a weather seal in a gap about the peripheral edge of the window, the improvements more particularly contributing to the rain water drainage of the molding.

BACKGROUND OF THE INVENTION

1. Field of the Invention

U.S Pat. No. 5,519,979 issued to Kunert et al. for "Method of Centering Windshield Glazings" on May 28, 1996 is one of numerous prior patents in which into a slightly oversized opening a slightly undersized window, or windshield, is seated or installed and a rubber molding used to serve as a weather seal or barrier, and to this end the molding occupies a blocking position against weather elements in the gap resulting from the size differences between the window and window opening. The Kunert et al. molding includes a laterally extending lip which assumes a U-shape in the gap and effectively channels off rain water, melting snow, and the like. In practice, however, the top of the U-shape closes when the molding is bent around a small radius corner of the window, and this closing movement adversely affects the water-draining functioning of the molding.

SUMMARY OF THE INVENTION

Broadly, it is an object of the present invention to provide a molding with a U-shaped water-draining configuration overcoming the foregoing and other shortcomings of the prior art.

More particularly, it is an object to configurate the leg of the molding in a clearance position from the window peripheral edge and thus constituting the molding component bounding the water-draining passage so that small radius-induced closing movement is nominal and consequently the flow passage remains open to continue to function for the purposes intended, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

DESCRIPTION OF THE PREFERRED EMBODIMENT

As known, into the front and rear openings of an auto are seated or installed glass windows, the front window shielding the driver from wind and thus being aptly known as a windshield. Both window openings are slightly oversized in relation to the slightly undersized cooperating glass windows and the size differences results in a gap between the window peripheral edge and the auto wall bounding the window opening. Also to be noted as known background is that a rubber molding is attached to the window peripheral edge so as to extend into the gap and serve as a weather seal as well as having other utility.

Figure 1:
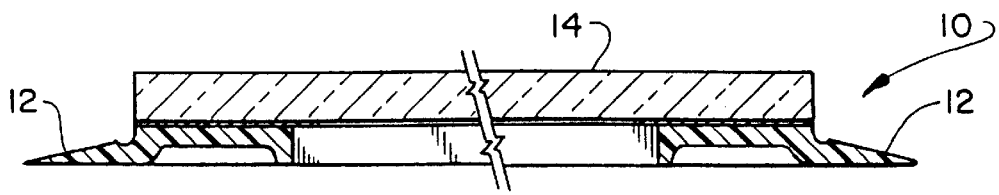
FIG. 1 is a simplified front elevational view of the prior art rubber molding of U.S. Pat. No. 5,519,979 used as peripheral edge framing of a glass auto window.

FIG. 1 depicts the molding and window construction of U.S. Pat. No. 5,519,979 issued to Kunert et al. for "Method of Centering Windshield Glazings" on May 28, 1996, in which the molding 10 is extruded with a laterally extending lip or leg 12.

Figure 2:
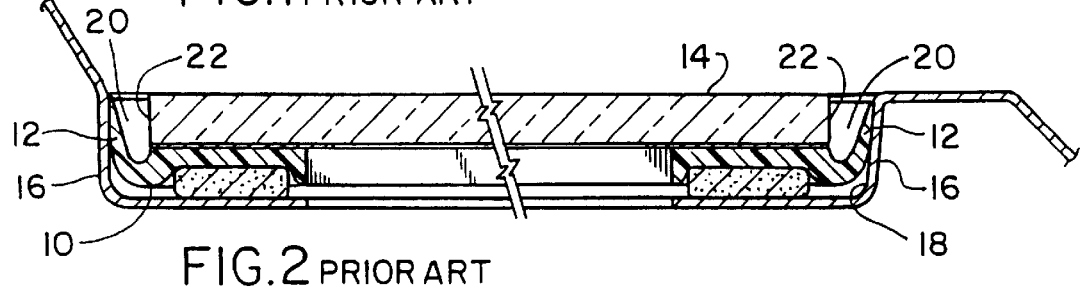
FIG. 2 is another elevational view of the FIG. 1 combined rubber molding and glass auto window in its installed condition in an auto window opening.
Figure 3:
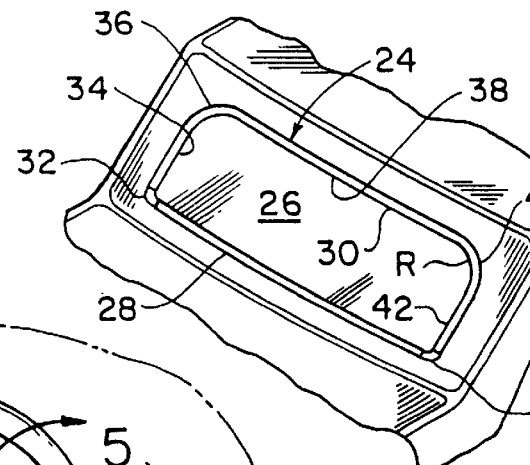
FIG. 3 is a perspective view of an installed auto rear window.

In the FIG. 2 installed condition of the assembled window 14 and molding 10 the spaced apart walls 16 bound an opening 18 into which the assembly is seated or installed that urges each leg 12 from a horizontal into a U-shape as illustrated, wherein said U-shape provides a weather seal function including specifically forming a flow passage 20 out of the clearance between the legs 12 and window edge 22 for effective drainage of rain. In the FIG. 2 installation of U.S. Pat. No. 5,519,979 and all other known installations of a rain-draining molding as exemplified by molding 10, the molding when bent around the small radius turn of the upper corners of the window, e.g. a corner R of FIG. 3, causes leg 12 to close upon the window edge 22 and thus diminish the water-drainage effectiveness of the flow passage 20 at the corner locations R. Typically metal or rigid pre-formed corner shapes are thus used to frame the window corners and the rubber molding cut to size and used to frame only the opposite sides, bottom and top length portion of window between the corners.

Figure 4:
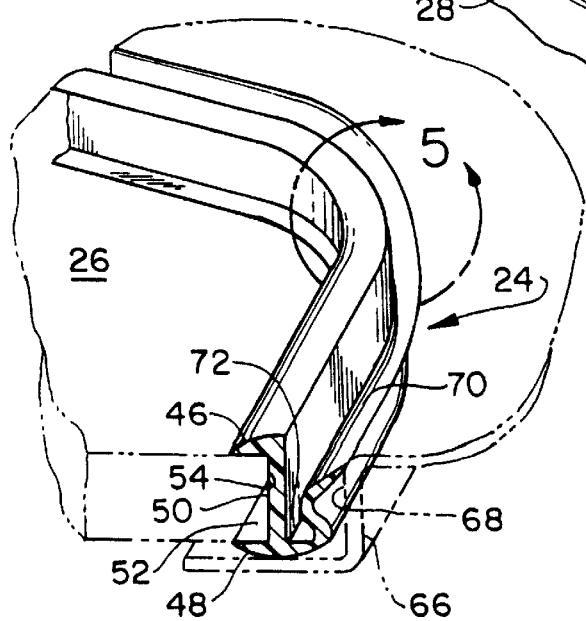
FIG. 4 is a partial perspective view of the within inventive molding as used as peripheral edge framing of the FIG. 3 auto rear window.
Figure 5:
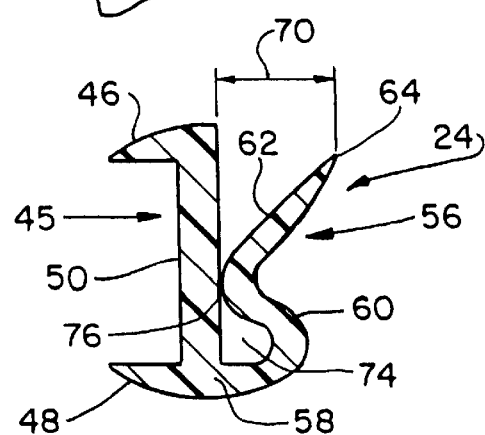
FIG. 5 is a cross sectional view of the FIG. 4 molding at the window corner area denoted by the reference arrow 5 in FIG. 4.

Referring now to FIGS. 4 and 5, there is disclosed a modified shaped molding 24 according to the present invention which, in the framing of a rear auto window 26, has a bottom window framing strip or length portion 28 which, of course, has no rain drainage requirement, and a single strip or length portion 30 extending from a bottom corner 32 up along the left window side 34, around left corner 36, along the window top edge 38, around right corner 40, and down along the right window side 42 to the bottom corner 44.

The molding strip 24 which is required to provide a water-draining function has a C-shaped configuration 45 consisting of upper and lower legs 46 and 48 joined by an intermediate leg 50 which cooperate to bound a compartment 52 for grippingly engaging a peripheral edge 54 of the rear auto window 26. To provide a water-draining function, integral to the configuration 45 is an "s" shaped leg 56 which extends from its attachment to the base of the C-shaped configuration 45, as at 58, which has a length portion 60 curved in concave relation to the window 26 and a succeeding length portion 62 in an opposite convex relation, and terminating in an end edge 64.

In the straight length portions of the molding 24, the end edge 64 is in maximum contact with the wall 66 bounding the window opening 68 and thus in turn bounds an opening 70 into a flow passage 72. In the corners 36, 40, there is some closing of leg 56 upon leg 50, but in practice this closing movement is resisted by the concave curvature of length portion 60 and thus there is maintained an opening 74 of an extent into the flow passage 72 to promote water drainage therethrough. If the flexibility of the rubber construction material of the molding 24 is great as would contribute to closing movement of the leg 56 and/or the radius of a corner 36 or 40 is very small and would similarly contribute to closing movement of the leg 56, this closing movement is limited to the abutment of the convexly curved length portion 62 against the leg 50, as at 76, and there thus remains for water drainage the upper portion of the water passage 72 bounded by the convex length portion 62 and the upper length portion of leg 50.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. An auto window molding operatively disposed in encircling relation about a peripheral edge of a sized auto window in supported relation in an oversized window opening, said molding comprising a horizontally oriented crown adapted to be positioned in a gap about said auto window peripheral edge resulting from said size difference between said auto window and said auto window opening, a first leg in depending relation from said crown and a second leg laterally extending from said first leg and a third leg in ascending relation from said second leg cooperating to bound a U-shaped configuration at a bottom of said gap, a first encountered concavely curved length portion and a succeeding encountered convexly curved length portion in said third leg deposed in a clearance position from said first depending leg so as to bound an exit flow passage for drainage of rain water flowing into said gap, said concavely and convexly encountered changes in curvature in said third leg being adapted to have an operative position in abutting relation against said first depending leg in a small radius bend of said molding about a corner of said auto window, whereby an upper length portion of said third leg above said abutment with said depending first leg is in a laterally extending relation defining an exit flow passage coextensive with said small radius bends of said molding to maintain said rain water drainage.

* * * * *